T. B. STOUT.
Grinding Mill.
No. 14,002. Patented Dec. 25, 1855.
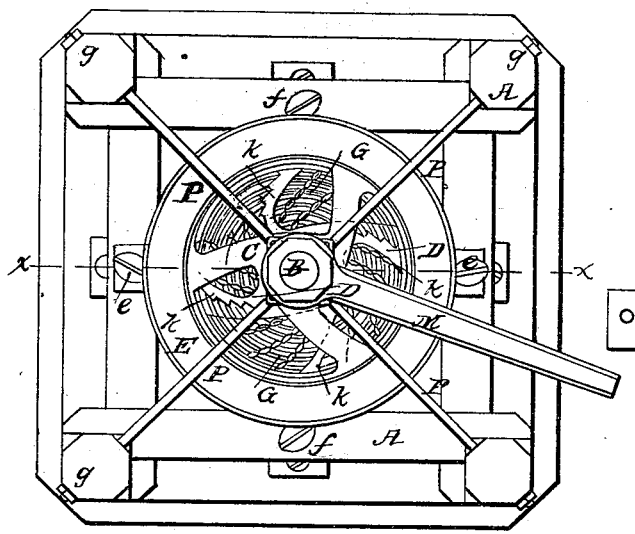
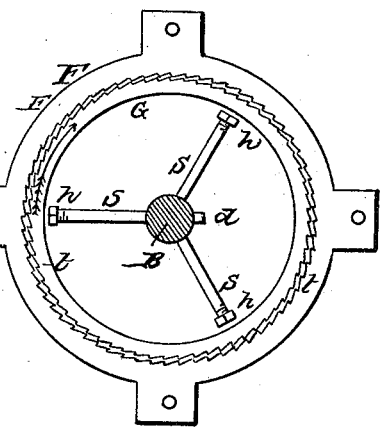
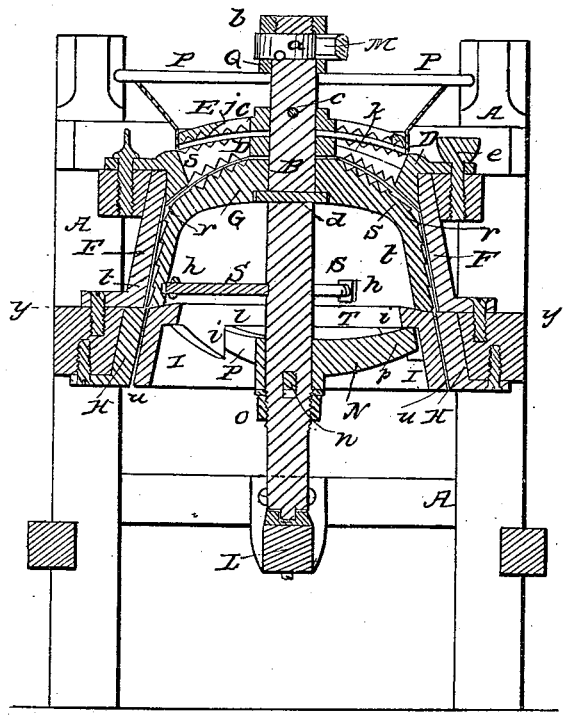
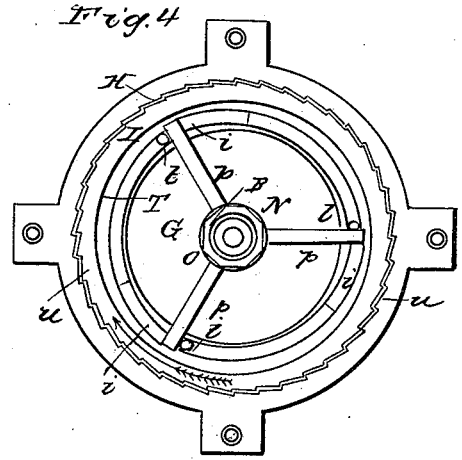
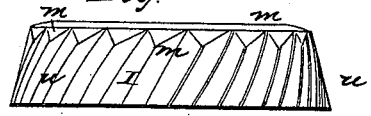

UNITED STATES PATENT OFFICE.

THOS. B. STOUT, OF KEYPORT, NEW JERSEY.

CORN AND COB MILL.

Specification of Letters Patent No. 14,002, dated December 25, 1855.

*To all whom it may concern:*

Be it known that I, THOMAS B. STOUT, of Keyport, in the county of Monmouth and State of New Jersey, have invented a new and Improved Portable Grinding-Mill; and I do hereby declare that the following is a full and exact description thereof, reference being had to the accompanying drawings, making part of this specification, Figure 1 being a plan of the mill; Fig. 1, a vertical section of the same in the plane $x\ x$, Fig. 1; Fig. 3, a horizontal section in the plane $y\ y$, Fig. 2, without the frame; Fig. 4, a bottom view of the mill without the frame; Fig. 5, a side view of a part detached; Fig. 6, a section of a portion detached.

Like letters designate corresponding parts in all the figures.

The various parts of the mill are mounted and secured in a suitable frame A, substantially as represented. The spindle B, rests upon an adjustable bridge-tree L, and its upper end turns in a collar Q, which is firmly secured in a central position by means of rods P, P, extending therefrom to, and passing through, the posts of the frame. Nuts $g$, $g$, are screwed upon the projecting ends of these rods, for the purpose of adjusting the collar to the exact position required. By this arrangement also I am enabled to apply power in any manner to the spindle without disarranging the mill. If horse power is to be applied, for crushing and grinding corn in the ear, a simple sweep M, is put on the spindle, a notch in its under side, fitting over a pin $a$, which passes through the spindle to couple it thereto, and a nut $b$, is then screwed down upon the end of the spindle to hold the sweep in place. If shelled corn, or other grain, is to be ground, requiring greater speed than can thus be obtained, the sweep is removed, and a pinion or pulley substituted, by which the mill may be connected with a horse-power, engine, or other driver, and geared to any desired speed.

The bur G is coupled to the spindle by means of a recess, cast in the top of its hollow part, into which a pin $d$, previously inserted through a hole in the spindle, irremovably enters, when the bur is passed over the spindle. This is an exceedingly simple and efficient means of coupling the bur and spindle together, and it also permits the spindle to be moved slightly in the bur, whereby I am enabled to adjust it in the most exact manner within the shell, as follows: A number (say three or four,) of rods S, S, are let a little distance into the spindle, just sufficient to keep them in place, whence they extend radially outward to the bur, and enter a little distance into holes formed therein, but not to the bottom thereof. Nuts $h$, $h$, previously placed upon the outer ends of these rods, are then screwed against the bur so as to hold the rods firmly against the spindle, and adjust the bur in a precisely central position within the shell F. This is an advantage, which no other similar mill possesses, within my knowledge, since some have the bur and spindle cast together, and others have them rigidly united without means of adjustment. In either case, the springing and warping incident to casting, or the imperfections in rigidly uniting the parts, render it almost impossible to place the bur and shell concentrically. It is obvious, that with a means of accurately adjusting the bur within its shell, a narrow intervening space may be allowed, so that fine grinding may be done, with less unevenness and loss of power, than without it.

Instead of casting the shell F, in one piece extending both around the sides and over the top of the bur, I cast the top D, (which I term the "regulator,") in a separate piece and make it adjustable vertically over the side piece, by means of screws $e\ e$, and $f\ f$, or their equivalents, passing through ears, or projections, on its sides, and into the side pieces of the frame A. The two opposite screws $e$, $e$, I have represented as traveling in the frame, for the purpose of moving the "regulator" downward, as seen in Fig. 2, while the other two screws $f$, $f$, travel in the "regulator," for moving it upward, as shown in Fig. 6. The "regulator" has suitable arms, extending from hub to periphery, which are provided with suitable projections, both on their upper and under sides for cutting and crushing the ears of corn, in connection with the revolving cutters C, C, above, and the bur, below each of which also have projections, to assist the action of those on the "regulator." The arms of the "regulator" may be curved somewhat, as seen in Fig. 1, so as to have a tendency to work the ears toward the center of the mill; and the edges, against which the ears are driven, are sharpened, or beveled, as seen at $k$, Figs. 1, and 2. The revolving cutters C, C, (which are coupled to the spindle by a pin c, and notch in their hub,) may also be curved in a similar manner; and their forward edges, as they revolve, are sharpened, as seen at j, Fig. 2, so that together with the arms of the "regulator," they cut, instead of breaking, the ears of corn, in the manner of shears, thus requiring much less power and exerting less strain on the mill, than the ordinary breaking arms. By constructing the cutters as near as possible to the spindle, and by the curved shape of the cutters and arms, whereby the ears are driven toward the center, I also gain a leverage, so as further to economize power. The hopper E, rests on the "regulator," just outside of the cutters C, C.

The cutting and crushing are done between the arms of the "regulator", the cutters C, C, and summit of the bur. The grinding proper is also commenced on the top of the bur. To this end, the continuous periphery of the "regulator" extends up over the bur, as far as the line where it is desired to commence the grinding. The portion of the top of the bur thus covered by the "regulator", is dressed with regular furrows like the sides, as seen at s, Fig. 2, and the continuous periphery of the "regulator" is also dressed like the shell F. The object of commencing the grinding on the top of the bur, is first to enable the space to be increased or diminished at pleasure, by adjusting the "regulator" up and down, and also to avoid the tendency to clog, which is very great when the grinding commences on the sides of the bur, when the full power of gravity is exerted to force the crushed grain downward; but with my arrangement, there is but little more than the centrifugal force to drive the crushed grain between the grinding surfaces. At r, Fig. 2, just where the sides and top of the bur meet, the edge is rounded off, so as to leave an enlarged space for the reception of any superabundance of grain which may be driven therein, and thus provide a further relief from clogging. There is also a little space between the shell and "regulator", at the same place, which serves the same purpose. The adjustable "regulator," enables me to vary the speed of grinding at pleasure, and also in a great measure, the degree of fineness.

The portion of the mill already described, constitutes all the essential parts of a mill for grinding corn and cobs into coarse meal, and comprises all that mills of this sort usually contain. In addition to this, I add an auxiliary bur I, and shell H, which enable me also to grind corn and other grain into fine meal and even flour. The additional shell H, forms simply a continuation of the shell F, except that the furrows are dressed in the opposite direction; that is, while the main shell and bur, are dressed so that their abrupt edges meet in the revolution of the bur, as seen at t, Fig. 3, this additional shell and bur are dressed so that their inclined edges meet, when both burs revolve in the same direction, as seen at Fig. 4. This additional shell might be cast in one piece with the shell F; but the additional, or auxiliary, bur I, is required to be separate from the main bur G, and is arranged in the following manner. It has no fixed connection with the spindle, but its upper edge may be a little convex; so that, by making the lower edge of the bur G, correspondingly concave, for it to fit against, it will naturally assume a concentric position. It is provided with a ledge T, and a number of suitable projections i, i, on its inner surface, against which the arms p, p, of a follower, or driver, N, strike, whereby the bur is both kept in place and driven around with the spindle B. This driver is coupled to the spindle by a pin, or key n, fitting in a notch in its hub, like those before described for coupling other parts to the spindle; and it is forced upward with the proper degree of pressure, by a nut o. The arms p, p, of the driver, enter notches in the projections i, i, or between them and pins l, l; so that there may be a little radial play of the bur thereon. This arrangement allows the bur to adopt its position to that of its shell H, and may by this means, be made to come quite in contact therewith, so that not only can the grinding be carried to almost any degree of fineness, but the dressings of the shell and bur, serve to sharpen each other. The furrows on the bur I, are alternately long and short, as shown at m, m, Fig. 5, that is, every other one does not reach to the upper edge, while the intervening ones do. The object of this is to facilitate the passage of the meal from the upper bur and shell, to the lower, and prevent clogging at their junction. When the bur I, has worn so much as to fail to grind properly, it can be replaced by a new one, with a very little cost, and without requiring any other part to be removed. The mill is therefore rendered much more durable than usual, and will perform well to the last.

What I claim as my invention, and desire to secure by Letters Patent, is—

1. The adjustable "regulator" D, arranged and operating in connection with the bur G, and shell F, substantially in the manner and for the purposes herein set forth.

2. I also claim coupling the spindle to the bur and adjusting it therein, by means of the recess and pin d, and the radial regulating rods S, S, substantially as described; and in combination therewith, the adjustment of the upper end of the spindle in the frame, by the rods P P, or their equivalents, so that the two adjustments may harmonize with each other, and no disarrangement of the bur in its shell may arise in the application of the power to the upper end of the spindle.

3. I also claim the auxiliary, loose bur I, dressed in the direction opposite to that of the main bur G, and so arranged that it may revolve nearly or quite in contact with, and adapt its position to, that of its shell H, unrestrained by the parts by which it is attached and driven, substantially in the manner and for the purposes herein set forth.

The above specification of my new and improved portable grinding mill, signed by me this fourth day of October 1855.

THOS. B. STOUT.

Witnesses:
J. S. BROWN,
CLEMENT S. STEELE.